(12) United States Patent
Huening (10) Patent No.: US 11,970,050 B2
(45) Date of Patent: Apr. 30, 2024

(54) PROTECTIVE COVER WITH GROUND SURFACE SEAL

(71) Applicant: Kenneth J. Huening, Los Gatos, CA (US)

(72) Inventor: Kenneth J. Huening, Los Gatos, CA (US)

( * ) Notice: Subject to any disclaimer, the term of this patent is extended or adjusted under 35 U.S.C. 154(b) by 146 days.

(21) Appl. No.: 17/794,945

(22) PCT Filed: Jan. 22, 2021

(86) PCT No.: PCT/US2021/014704
§ 371 (c)(1),
(2) Date: Jul. 22, 2022

(87) PCT Pub. No.: WO2021/150950
PCT Pub. Date: Jul. 29, 2021

(65) Prior Publication Data
US 2023/0058582 A1  Feb. 23, 2023

Related U.S. Application Data

(60) Provisional application No. 62/965,558, filed on Jan. 24, 2020.

(51) Int. Cl.
*B60J 11/04* (2006.01)
(52) U.S. Cl.
CPC ..................... *B60J 11/04* (2013.01)
(58) Field of Classification Search
CPC ........................................................ B60J 11/04
See application file for complete search history.

(56) References Cited

U.S. PATENT DOCUMENTS

| | | | | |
|---|---|---|---|---|
| 3,004,769 | A | * | 10/1961 | Turner .................. B62D 25/165 52/63 |
| 3,732,581 | A | | 5/1973 | Pitti et al. |
| 4,122,637 | A | * | 10/1978 | Runge ..................... A01F 25/13 52/745.08 |
| 4,261,401 | A | | 4/1981 | Hickey |
| 4,625,468 | A | * | 12/1986 | Hampel .................. E04H 15/56 135/94 |
| 6,739,095 | B2 | | 5/2004 | Glynos |
| 7,871,052 | B2 | * | 1/2011 | Baum ....................... E04H 4/10 248/500 |

(Continued)

FOREIGN PATENT DOCUMENTS

WO  2019089209 A1  5/2019

OTHER PUBLICATIONS

ISR and Written Opinion for PCTUS2021014704 dated Apr. 22, 2021, 8 pages.

*Primary Examiner* — Tri M Mai
(74) *Attorney, Agent, or Firm* — Procopio, Cory, Hargreaves & Savitch LLP (57) ABSTRACT

Protective cover with an apron that provides a ground surface seal. In an embodiment, the protective cover comprises an apron and a plurality of straps. The apron may comprise an apron wall having a top edge and a bottom edge, and a hollow sealing tube along the entire bottom edge of the apron wall. The sealing tube may comprise at least one inlet for inserting a substance into the sealing tube. Each of the plurality of straps may have two ends that are both attached to the top edge of the apron wall on opposing sides of the apron wall.

20 Claims, 5 Drawing Sheets

(56) References Cited

U.S. PATENT DOCUMENTS

2003/0140568 A1\* 7/2003 Glynos .................. A01F 25/13
52/4
2013/0199589 A1  8/2013 Gaudet, Jr. et al.

\* cited by examiner

PROTECTIVE COVER WITH GROUND SURFACE SEAL

CROSS-REFERENCE

This application is a U.S. national Stage entry of PCT Application No. PCT/US2021/014704, filed Jan. 22, 2021, which claims the benefit of U.S. Provisional Application No. 62/965,558, filed on Jan. 24, 2020, which is hereby incorporated herein by reference as if set forth in full.

In addition, this application is related to International Patent App. No. PCT/US2018/055616, filed on Oct. 12, 2018, which claims priority to U.S. Provisional Patent App. No. 62/580,870, filed on Nov. 2, 2017, which are hereby incorporated herein by reference as if set forth in full.

BACKGROUND

Field of the Invention

The embodiments described herein are generally directed to a protective cover, and, more particularly, to an apron that forms a ground surface seal for protecting an object (e.g., vehicle, furniture, etc.) from intrusion by external influences, such as rodents, insects, water, weather (e.g., wind, rain, snow, etc.), and the like, into and around the object.

Description of the Related Art

Conventional protective covers do not provide any seal at the ground surface. Unfortunately, this allows intrusion by external influences, which can damage the object being covered. External influences may include, without limitation, rodents, insects, water, wind, rain, snow, and/or other weather, and/or any other influence that can penetrate a gap or loose fit between an edge of the protective cover and the ground. Thus, what is needed is a protective cover that forms a ground surface seal to protect the object from such influences.

SUMMARY

Accordingly, an apron that forms a ground surface seal is disclosed. In an embodiment, the protective cover comprises: an apron comprising an apron wall having a top edge and a bottom edge, and a hollow sealing tube along the entire bottom edge of the apron wall, wherein the sealing tube comprises at least one inlet for inserting a substance into the sealing tube; and a plurality of straps, wherein each of the plurality of straps has two ends that are both attached to the top edge of the apron wall on opposing sides of the apron wall.

Each of the plurality of straps may be detachable from the apron wall on at least one of the two ends. Each of the plurality of straps may be detachable from the apron wall on both of the two ends. Each of the plurality of straps may be adjustable in length. The protective cover may further comprise a top cover sized to cover the plurality of straps.

The sealing tube may comprise an envelope formed in the bottom edge of the apron wall. The sealing tube may further comprise a pipe within the envelope. The at least one inlet may comprise a valve through a wall of the envelope and a wall of the pipe that provides a flow path for fluid from an exterior of the sealing tube into an interior of the sealing tube.

The protective cover may further comprise a fastener that releasably attaches an outer edge of the top cover to the top edge of the apron wall. The fastener may comprise a zipper comprising a first zipper side and a second zipper side configured to releasably engage with the first zipper side, wherein the first zipper side extends around a circumference of the top cover, and wherein the second zipper side extends around a circumference of the top edge of the apron wall.

The apron wall may be at least eighteen inches tall between the top edge and the bottom edge. The apron wall may be at least twenty-four inches tall between the top edge and the bottom edge. The apron wall may be at least thirty-six inches tall between the top edge and the bottom edge.

The apron may comprise a single segment with two ends, and the two ends may be configured to overlap and releasably affix to each other at an overlap region. The overlap region may comprise two fasteners at opposite ends of the overlap region. Each of the two fasteners may comprise a first portion that is fixed to a first one of the two ends of the single segment of the apron and a second portion that is fixed to a second one of the two ends of the single segment of the apron, and the first portion may be configured to releasably engage with the second portion. Each of the two fasteners may comprise Velcro™.

The sealing tube may have a diameter of at least two inches. The protective cover may be sized and shaped to cover a vehicle. A profile of the apron may be elliptical.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

In an embodiment, an apron that forms a ground surface seal is disclosed. The apron may be used by itself (e.g., in a situation in which the user does not desire to cover the entire object), integrated into a top cover during manufacture, added to or packaged with a top cover after manufacture, or added or retrofitted to an existing, previously manufactured protective cover (e.g., a conventional protective cover which does not have a ground seal). The apron, whether by itself or with a top cover, may be used indoors or outdoors to store, cover, and protect objects (e.g., vehicles, furniture, etc.) from weather (e.g., wind, rain, snow, etc.), occupation or damage by rodents or insects, and/or the like. The apron may either loosely conform to the object (e.g., generic cover, such as for furniture) or tightly conform to the object (e.g., custom cover, such as a custom vehicle cover, for example, shaped for a particular vehicle). While the apron will be primarily described and illustrated herein for use with a vehicle, it should be understood that the apron may be sized and adapted to protect any object, including, without limitation, indoor and/or outdoor furniture (e.g., chairs, tables, barbeque grills, dressers, shelves, etc.).

Figure 1A:
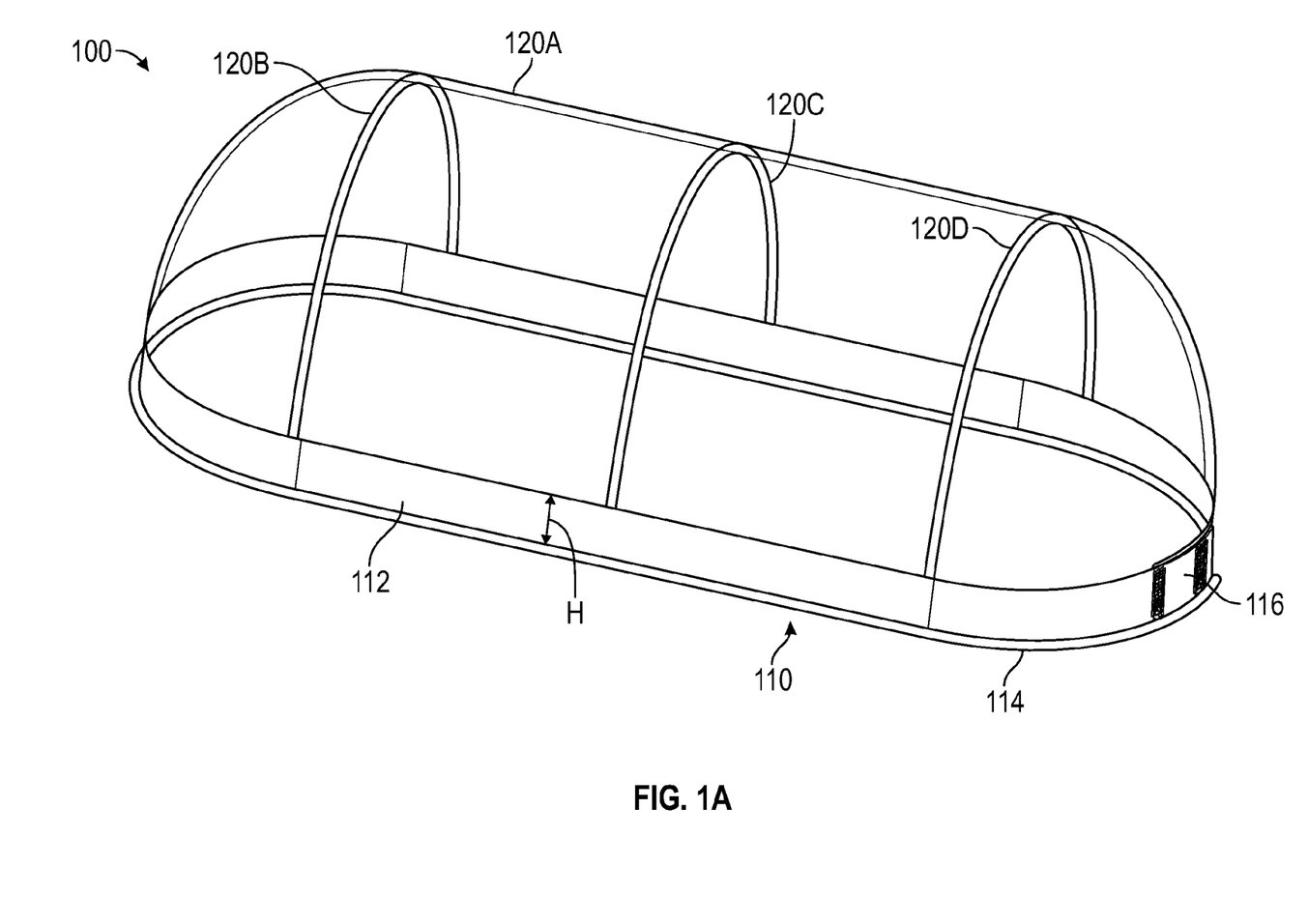
FIGS. 1A and 1B illustrate a protective cover, according to embodiments.
Figure 1B:
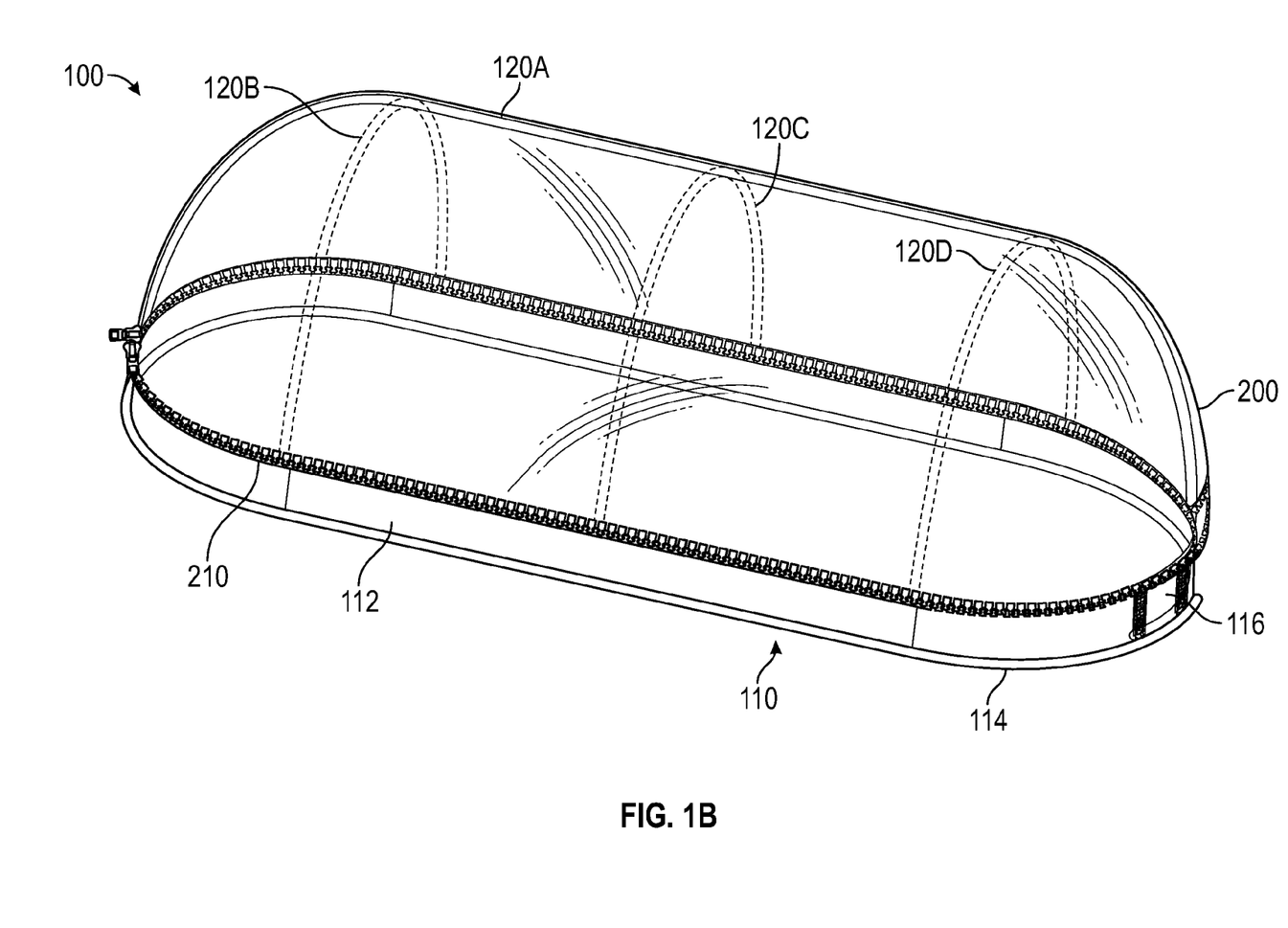

FIGS. 1A and 1B illustrates a protective cover 100, according to embodiments. Protective cover 100 may comprise an apron 110 and one or more—and preferably, a plurality of—straps 120 for suspending apron 110. Apron 110 may comprise an apron wall 112, a sealing tube 114 at a bottom end of apron wall 112, and at least one overlap region 116. As used herein, the terms "top" and "bottom" are used for convenience of understanding to convey the relative positions of various components with respect to each other, and do not imply any specific orientation of those components in absolute terms (e.g., with respect to the external environment or the ground). However, it should be understood that, during deployment of protective cover 100, apron 110 will generally be on the bottom and touching the ground, whereas strap(s) 120 will be on the top, farther from the ground, and resting over a top of the object being protected to thereby suspend apron 110 in a ring around the object.

In an embodiment, one or more straps 120 are used to suspend apron 110 around an object, such as a vehicle. Each strap 120 may have two ends that are attached to opposing sides of apron 110. Each strap 120 may be adjustable (e.g., a ratchet strap) that enables the length of strap 120 to be adjusted in order to remove or reduce slack around the object to be protected.

In an embodiment in which apron 110 has a circular or substantially circular profile, protective cover 100 may comprise at least two straps 120 that cross at the top and are collectively connected to four attachment points on apron 110 that are spaced at equidistant intervals around the circumference of apron 110. The two straps 120 may cross at a substantially orthogonal angle in a top plan view.

Figure 2:
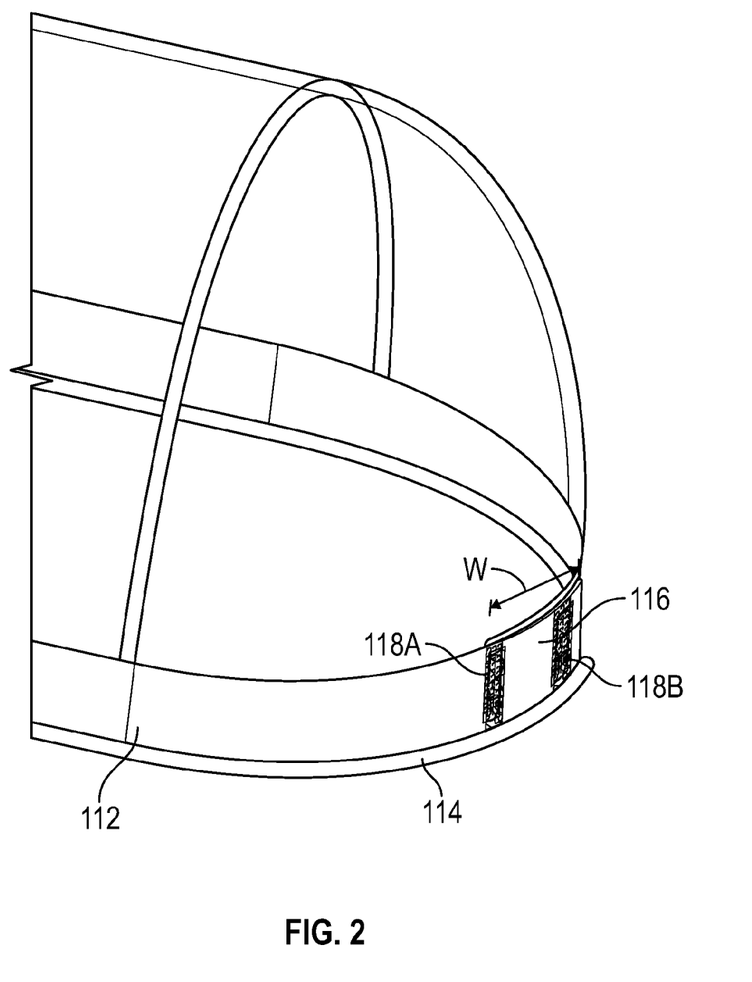
FIG. 2 illustrates a view of an overlap region in a protective cover, according to an embodiment.

In the illustrated embodiment, apron 110 has an elliptical profile. In this embodiment or another embodiment, a non-circular profile, a longitudinal strap 120A may connect the two points along the circumference of apron 110 that have the greatest distance from each other. In addition, one or a plurality of lateral straps 120B, 120C, and/or 120D may cross longitudinal strap 120A at substantially orthogonal angles in a top plan view, as illustrated in FIG. 2. In this case, longitudinal strap 120A may be thought of as a spine of protective cover 100 and lateral straps 120B-120D may be thought of as ribs of the protective cover 100.

It should be understood that protective cover 100 may comprise other configurations of straps 120, as long as straps 120 effectively suspend apron 110 around the object to be protected. Straps 120 may be permanently integrated or otherwise attached to apron 110 (e.g., via stitching, adhesive, etc.) or releasably attached to apron 110 (e.g., via hooks and loops such as Velcro™, buckles, screws, bolts and nuts, etc.). Straps 120 may attach to apron 110 on the interior of apron wall 112 and/or sealing tube 114 and/or the exterior of apron wall 112 and/or sealing tube 114. In addition, straps 120 may be similarly permanently (e.g., via stitching, adhesive, etc.) or releasably (e.g., via hooks and loops such as Velcro™, buckles, screws, bolts and nuts, etc.) attached to each other at one or more, including potentially all, of the points at which they cross. Alternatively, straps 120 may be attached to apron 110, but be unattached from each other.

Apron 110 may be made of a water-proof or water-resistant material. Apron 110 may be thicker than, less thick than, or the same thickness as straps 120. Apron wall 112, sealing tube 114, and straps 120 may be made of the same material or different materials. In an embodiment, apron wall 112 is made of 600 D polyester, and preferably 600 D polyester with a poly-vinyl chloride (PVC) coating (e.g., on the interior and/or exterior side) to improve durability. Apron 110 has a height H when deployed. In an embodiment, H is 18 inches, 24 inches, 36 inches, or anywhere between 18 and 36 inches. Each strap 120 may be configured in length, given the size and shape of the object to be protected (e.g., the size and shape of a vehicle), to hold apron 110 to its full height H, so as to keep the top edges of apron wall 112 fully elevated. For example, in an embodiment of protective cover 100 that is designed for a sedan, straps 120B and 120D may be shorter than strap 120C to account for the tendency of a sedan to be shorter in the front and the back than in the middle. On the other hand, in an embodiment of protective cover 100 that is designed for a sport utility vehicle (SUV), strap 120B may be shorter than straps 120C and 120D to account for the tendency of SUVs to be shorter in the front and taller in the middle and back. Similarly, in an embodiment of protective cover 100 for a van or other vehicle which is more consistent in height along its entire length, straps 120B-120D may all be the same length. Alternatively or additionally, the length of each strap 120 may be adjustable, for example, via fastening means (e.g., hooks and loops, such as Velcro™, a buckle, etc.) that enables a loop in each strap 120 to be lengthened or shortened to thereby increase or decrease the length of the strap 120.

Preferably, in all cases, during deployment, apron 110 is held to its full height with sealing tube 112 flush on the ground. Thus, apron 110 forms a wall around the object to be protected, while the weight of apron 110—and, in particular, the weight of sealing tube 114—forms a seal between the bottom of apron 110 and the ground, in order to prevent intrusion. It should be understood that, in an actual implementation, depending on height H, apron 110 will either extend exactly flush with the ground (e.g., if the height of protective cover 100, when deployed over the object, is exactly the height of the object) or, in a preferred embodiment, extend at least slightly beyond the bottom of the object (e.g., if the height of protective cover 100, when deployed over the object, is greater than the height of the object) so that it bends outward or inward, or crumples or folds, to lie flush with the ground. Accordingly, a user may deploy protective cover 100 over a vehicle or other object and apron 110 will act as a barrier against intrusions from rodents or other critters, water or other weather, and/or the like.

As illustrated in FIG. 1B, protective cover 100 may comprise or be used with a protective top cover 200 that is permanently attached, releasably attached, or unattached from apron 110 and/or straps 120. Top cover 200 may be integrated with protective cover 100 or may comprise an existing cover or tarp that is used in combination with protective cover 100. For example, top cover 200 may be placed over an object to be protected, and protective cover 100 may be placed over top cover 200 to weight top cover 200 down via the downward force applied by the weights of straps 120 and sealing tube 114. Alternatively, protective cover 100 may be placed over the object first, and top cover 200 may be placed over protective cover 100 to cover the spaces between straps 120. In either case, top cover 200 may be releasably affixed to protective cover 100 by any known fastening means, or may be unaffixed to protective cover 100 but held to protective cover 100 by its own weight or the weight of protective cover 100. Top cover 200 may be made of a breathable, sun-reflective, and durable material that is the same or different than the material from which apron 110 and/or straps 120 are made.

Top cover 200, apron 110, and/or straps 120 may be manufactured as a single piece of material or multiple pieces of material that are then joined during or after manufacture. In an embodiment, top cover 200 is a separate piece that releasably fastens to apron 110 via a fastener, such as a zipper. For example, the top edge of apron 110 may comprise one side of a zipper 210 around its entire circumference, and the bottom edge of top cover 200 may comprise the other side of zipper 210 arounds its entire circumference. Thus, the top edge of apron 110 may be zipped to the bottom edge of top cover 200, to thereby join the two together. This can be especially helpful when used to protect a large and/or tall object, such as a truck, van or SUV, since it can be difficult to pull a full cover over such an object. Advantageously, only top cover 200 must be pulled or thrown over the object, while apron 110 simply needs to be pulled up from the ground and fastened to top cover 200, for example, by zipping the corresponding sides of zipper 210 together.

Figure 3:
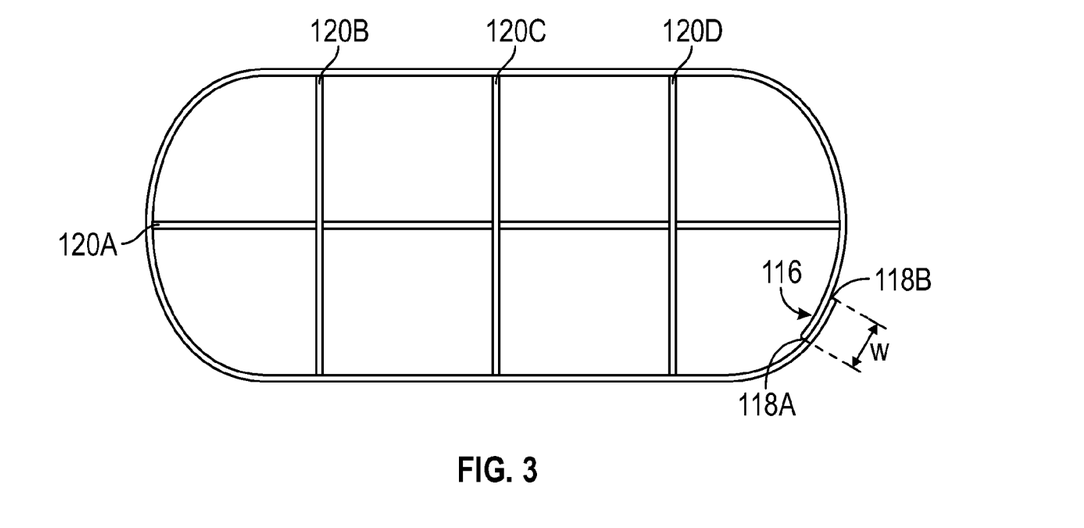
FIG. 3 illustrates a top-down plan view of a protective cover, according to an embodiment.

FIG. 2 illustrates a closer view of overlap region 116, according to an embodiment. As illustrated, apron wall 112 may be formed as a rectangle with one end overlapping the other end to form a ring with a circular profile, elliptical profile (e.g., as illustrated in FIG. 3), or other shaped profile. The two ends of apron wall 112 may be permanently or releasably affixed to each other to hold apron wall 112 in the ring form. In the illustrated embodiment, the two ends of apron wall 112 are releasably affixed via two fasteners 118A and 118B. Each fastener 118 may comprise corresponding strips of industrial-strength hooks and loops (e.g., Velcro™). For example, a first vertical strip of hooks or loops may be formed on or near the edge of a first end of apron wall 112, and a corresponding second vertical strip of loops or hooks, configured to engage with the first vertical strip, may be formed at a width W from the edge of the second end of apron wall 112. Similarly, a third vertical strip of loops or hooks may be formed on or near the edge of a second end of apron wall 112, opposite the first end, and a corresponding fourth vertical strip of hooks or loops, configured to engage with the third vertical strip, may be formed at the width W from the edge of the first end of apron wall 112. Thus, when the first vertical strip and the second vertical strip are engaged as fastener 118A and the third vertical strip and the fourth vertical strip are engaged as fastener 118B, apron wall 112 is held in a ring form, configured to encircle the object to be protected, with an overlap region 116 of width W. Width W of overlap region 116 may be at least nine inches. In addition, apron 110 may be split by releasing and separating fasteners 118, to enable entry of the object (e.g., vehicle) into the interior of apron 110 and exit of the object out of the interior of apron 110.

It should be understood that fasteners 118 may comprise other fastening means than described above. In addition, instead of using releasable fastening means, fasteners 118 could permanently affix the ends of apron wall 112 to each other. For example, fasteners 118 could comprise stitching, adhesive, and/or the like. Regardless of the type and whether or not it is permanent or releasable, each fastener 118 may have a width of at least one inch, and preferably two inches. In addition, each fastener 118 may extend the entire height H of apron 110.

FIG. 3 illustrates a top-down plan view of protective cover 100, according to an embodiment. As illustrated, in an embodiment, apron 110 may be manufactured as a single linear segment. The segment may be bent, and then the two ends of the segment may be fixed to each other using fasteners 118 into a ring (e.g., with an elliptical profile) capable of surrounding an object. It should be understood that, as used herein, the term "segment" only refers to the outline or profile of apron 110, and that a single segment may comprise numerous different materials and/or components.

In an alternative embodiment, apron 110 may comprise a plurality of segments that are each joined to adjacent segments via fasteners 118 to form a ring. In this case, apron 110 may comprise two or more overlap regions 116. In particular, given N segments, apron 110 would comprise N overlap regions 116. Thus, an embodiment of apron 110 with two segments would comprise two overlap regions 116, an embodiment of apron 110 with three segments would comprise three overlap regions 116, an embodiment of apron 110 with four segments would comprise four overlap regions 116, and so on and so forth.

In addition, each overlap region 116 may comprise at least two fasteners 118 on each end of the overlap region 116. Thus, given N segments, apron 110 would comprise 2×N fasteners 118. An embodiment of apron 110 with two segments would comprise four fasteners 118, an embodiment of apron 110 with three segments would comprise six fasteners 118, an embodiment of apron 110 with four segments would comprise eight fasteners 118, and so one and so forth.

While a plurality of segments enables a user to more easily fold protective cover 100 or apron 120 for storage or transportation, improper segmentation can lead to gaps between sealing tube 130 and the ground, which compromises the protective qualities of the ground seal. Thus, as discussed above, each segment may overlap each adjacent segment by a width W in overlap regions 116 and be fastened by at least two fasteners 118 on both sides of each overlap region 116 to create a firm seal.

Conformance to the ground surface, during deployment of protective cover 100, may be achieved by a sealing tube 114, which may be filled with a surface contouring material. Sealing tube 114 may be sealed or fixed (e.g., sewn) to apron wall 112 to prevent any gaps within apron 110. In an embodiment, sealing tube 114 may comprise or be formed as an envelope that contains the contouring material. The envelope may be at least two-inches wide to ensure that sealing tube 114 is of sufficient size and weight to conform to the ground surface. For example, the envelope may have a substantially cylindrical shape with a diameter of two or more inches. However, a width or diameter of less than two inches may be used (e.g., if the envelope is filled with a heavier contouring material).

Figure 4:
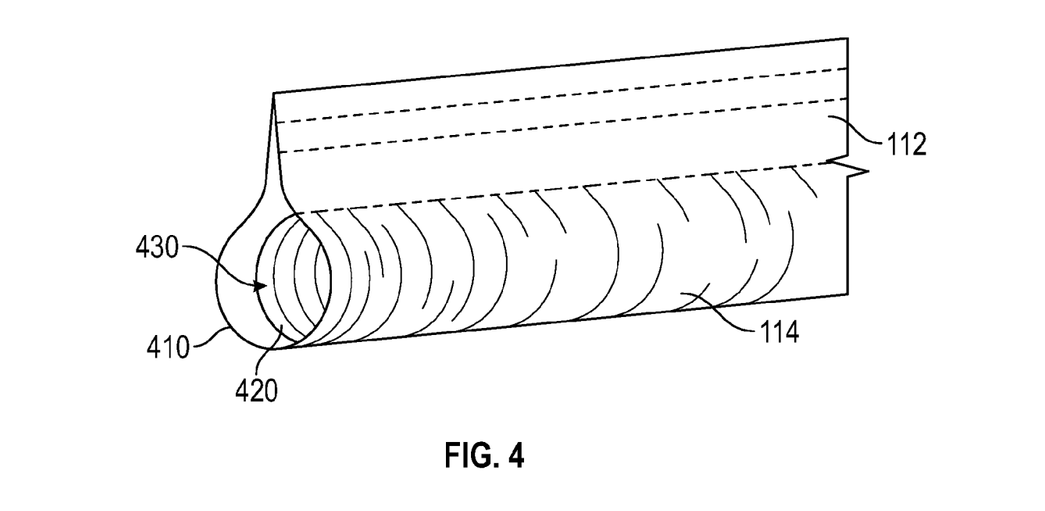
FIG. 4 illustrates a cut-away portion of a sealing tube, according to an embodiment.
Figure 5:
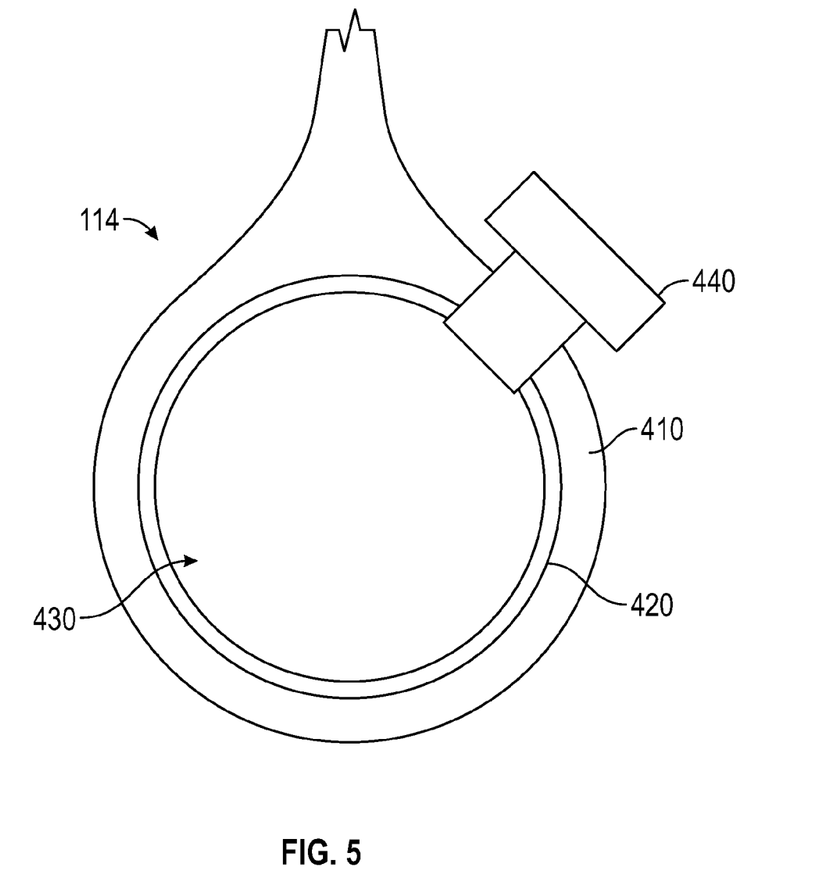
FIG. 5 illustrates a cross-section view of a sealing tube, according to an embodiment.

FIG. 4 illustrates a cut-away portion of sealing tube 114, and FIG. 5 illustrates a cross-sectional view of sealing tube 114, according to an embodiment. As illustrated, sealing tube 114 may comprise a corrugated pipe 420 inserted into a tubular envelope 410 along the bottom edge of apron wall 112. Corrugated pipe 420 defines an interior 430 of sealing tube 114. In an embodiment, the contouring material is a fluid, such as water. In such an embodiment, one or more valves 440 may be inserted through the wall of envelope 410 and corrugated pipe 420. Each valve 440 may be configured to open to allow passage of the fluid from the exterior of envelope 410 into the interior 430 of sealing tube 114 (e.g., to fill sealing tube 114), and close to prevent egress of the fluid out of the interior 430 of sealing tube 114. In an embodiment which uses water as the contouring material, each valve 440 may be configured to connect to a standard fitting for a hose or other water line. Each valve or one or more different valves may also be configured to open to allow passage of the fluid from the interior 430 of sealing tube 114 to the exterior of envelope 410 (e.g., to drain sealing tube 114 for easier storage, shipping, or other transportation). A valve that is intended to be used to fill sealing tube 114 may be oriented upwards from the interior of sealing tube 114 to the exterior of the envelope, whereas a valve that is intended to be used to drain sealing tube 114 may be oriented downwards from the interior of sealing tube 114 to the exterior of the envelope. However, it should be understood that a single valve may be used to both fill and drain sealing tube 114, but may require a user to flip or otherwise manipulate sealing tube 114 to switch from filling to draining.

In an alternative embodiment, the contouring material may be a dry material, such as dry, powdered sand or a material with similar characteristics. However, the ability to fill sealing tube 114 with water is preferred, since water is more easily available to most users and naturally distributes itself evenly throughout sealing tube 114. Thus, protective cover 100 may be shipped to users with sealing tube 114 unfilled, and the user may easily fill sealing tube 114 with water after protective cover 100 has been received. This reduces the weight of shipments and thereby reduces shipment costs.

The type and amount of the contouring material and the size of envelope 410 in sealing tube 114 should be selected to gravitationally seal apron 110 to the ground surface with sufficient weight, so as to prevent or restrict rodents and/or insects from passing underneath sealing tube 114, without compromising the conformance of sealing tube 114 to the ground. If sealing tube 114 is overfilled (e.g., too much water is used), sealing tube 114 may not properly conform to the ground. On the other hand, if sealing tube 114 is under-filled (e.g., too little water is used), sealing tube 114 may not be heavy enough to seal to the ground. In other words, gaps may form between sealing tube 114 and the ground, or sealing tube 114 may not be heavy enough to restrict the ingress of rodents or insects.

In an embodiment, straps 120 releasably attach to the top edge of apron 110. The releasable attachment may be implemented using any known fastening means, including, without limitation, hooks and loops (e.g., Velcro™), buckles, and/or the like. This enables a user to separate apron 110 from straps 120, for example, in order to lower apron 110. Thus, if protective cover 100 is designed to protect a vehicle, detachable apron 110 enables a user to release the suspension of apron 110 by straps 120, so that apron 110 falls to the ground. Specifically, when exiting a parking space, a user may detach (e.g., unhook or unbuckle) at least one end of each strap 120 from its respective attachment point to apron 110. Gravity will force apron 110 to collapse (e.g., crumple or fold) to the ground, but apron 110 will remain in its current outline (e.g., despite rain or other external influences), around the vehicle, due to the weight of sealing tube 114. The user may then leave apron 110 on the ground (e.g., with sealing tube 114 remaining in a substantially elliptical shape, representing the outline of the vehicle) and drive into or out of the interior of apron 110 by driving over one side of apron 110. In other words, the user only needs to place apron 110 once (e.g., in his or her garage, car port, or other parking space), and does not have to move it (or may only move it infrequently) for all subsequent uses. Furthermore, the user no longer has to lift apron 110 (which may be heavy due to sealing tube 114) over the vehicle for each use. When the user needs to raise apron 110, the user can simply drive over one side of apron 110 to park the vehicle in the interior of apron 110. Then, for each strap 120, the user can ensure that a first end of the strap 120 is attached to one side of apron 110, throw or drag the second end of the strap 120 over the vehicle to the opposing side of apron 110, and reattach the second end of the strap 120 to the opposing side of apron 110, to thereby resuspend apron 110 around the vehicle, to once again protect the vehicle with protective cover 100 having a ground seal formed by sealing tube 114. This can be done in conjunction with placing a top cover 200 under straps 120 or over straps 120 and/or fastening top cover 200 to apron 120 (e.g., via zipper 210).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A protective cover comprising:
an apron comprising an apron wall having a top edge and a bottom edge, and a hollow sealing tube along the entire bottom edge of the apron wall, wherein the sealing tube comprises at least one inlet for inserting a substance into the sealing tube; and
a plurality of straps, wherein each of the plurality of straps has two ends that are both attached to the top edge of the apron wall on opposing sides of the apron wall.

2. The protective cover of claim 1, wherein each of the plurality of straps is detachable from the apron wall on at least one of the two ends.

3. The protective cover of claim 2, wherein each of the plurality of straps is detachable from the apron wall on both of the two ends.

4. The protective cover of claim 1, wherein each of the plurality of straps is adjustable in length.

5. The protective cover of claim 1, wherein the sealing tube comprises an envelope formed in the bottom edge of the apron wall.

6. The protective cover of claim 5, wherein the sealing tube further comprises a pipe within the envelope.

7. The protective cover of claim 6, wherein the at least one inlet comprises a valve through a wall of the envelope and a wall of the pipe that provides a flow path for fluid from an exterior of the sealing tube into an interior of the sealing tube.

8. The protective cover of claim 1, further comprising a top cover sized to cover the plurality of straps.

9. The protective cover of claim 1, further comprising a fastener that releasably attaches an outer edge of the top cover to the top edge of the apron wall.

10. The protective cover of claim 9, wherein the fastener comprises a zipper comprising a first zipper side and a second zipper side configured to releasably engage with the first zipper side, wherein the first zipper side extends around a circumference of the top cover, and wherein the second zipper side extends around a circumference of the top edge of the apron wall.

11. The protective cover of claim 1, wherein the apron wall is at least eighteen inches tall between the top edge and the bottom edge.

12. The protective cover of claim 11, wherein the apron wall is at least twenty-four inches tall between the top edge and the bottom edge.

13. The protective cover of claim 12, wherein the apron wall is at least thirty-six inches tall between the top edge and the bottom edge.

14. The protective cover of claim 1, wherein the apron comprises a single segment with two ends, and wherein the two ends are configured to overlap and releasably affix to each other at an overlap region.

15. The protective cover of claim 14, wherein the overlap region comprises two fasteners at opposite ends of the overlap region.

16. The protective cover of claim 15, wherein each of the two fasteners comprises a first portion that is fixed to a first one of the two ends of the single segment of the apron and a second portion that is fixed to a second one of the two ends of the single segment of the apron, and wherein the first portion is configured to releasably engage with the second portion.

17. The protective cover of claim 16, wherein each of the two fasteners comprises Velcro™.

18. The protective cover of claim 1, wherein the sealing tube has a diameter of at least two inches.

19. The protective cover of claim 1, wherein the protective cover is sized and shaped to cover a vehicle.

20. The protective cover of claim 19, wherein a profile of the apron is elliptical.

* * * * *